(12) United States Patent
Davy et al.

(10) Patent No.: US 12,036,922 B2
(45) Date of Patent: Jul. 16, 2024

(54) DEVICE AND SYSTEM FOR THE TEMPORARY AND ANTICIPATORY ACCENTUATION OF AT LEAST ONE STORAGE DEVICE LOCATED IN A MOTOR VEHICLE, AND MOTOR VEHICLE EQUIPPED THEREWITH

(71) Applicant: Bayerische Motoren Werke Aktiengesellschaft, Munich (DE)

(72) Inventors: Elsa Davy, Munich (DE); Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 151 days.

(21) Appl. No.: 17/790,521

(22) PCT Filed: Dec. 14, 2020

(86) PCT No.: PCT/EP2020/086046
§ 371 (c)(1),
(2) Date: Jul. 1, 2022

(87) PCT Pub. No.: WO2021/136647
PCT Pub. Date: Jul. 8, 2021

(65) Prior Publication Data
US 2023/0031255 A1   Feb. 2, 2023

(30) Foreign Application Priority Data
Jan. 3, 2020  (DE) ..................... 10 2020 100 041.3

(51) Int. Cl.
*G08B 21/00*  (2006.01)
*B60Q 3/217*  (2017.01)
(Continued)

(52) U.S. Cl.
CPC ............... *B60Q 3/80* (2017.02); *B60Q 3/217* (2017.02); *B60Q 3/225* (2017.02); *B60R 7/04* (2013.01)

(58) Field of Classification Search
CPC .......... B60Q 3/80; B60Q 3/217; B60Q 3/225; B60R 7/04; B60R 16/02
(Continued)

(56) References Cited

U.S. PATENT DOCUMENTS

2015/0343944 A1* 12/2015 Salter ..................... B60Q 3/208
                                                              362/543
2016/0280128 A1*  9/2016 Cannon ................... B60Q 3/16
(Continued)

FOREIGN PATENT DOCUMENTS

DE          103 14 046 A1    10/2004
DE    10 2013 013 204 A1     2/2015
(Continued)

OTHER PUBLICATIONS

International Search Report (PCT/ISA/210) issued in PCT Application No. PCT/EP2020/086046 dated Mar. 30, 2021 with English translation (five (5) pages).
(Continued)

*Primary Examiner* — Mark S Rushing
(74) *Attorney, Agent, or Firm* — Crowell & Moring LLP

(57) ABSTRACT

A device for temporary accentuation of a storage device that is located in the motor vehicle and is operatively connected to at least one accentuator includes a controller configured to operatively connect, at least temporarily, to the accentuator and to activate the accentuator, change or not change the accentuator during operation, or deactivate the accentuator on a basis of an accentuation signal output by a calculation means, wherein the accentuation signal represents accentua-
(Continued)

tion interest information, and the accentuator, when deactivated, cannot be recognized as such by an observer.

20 Claims, 1 Drawing Sheet

(51) Int. Cl.
*B60Q 3/225* (2017.01)
*B60Q 3/80* (2017.01)
*B60R 7/04* (2006.01)

(58) Field of Classification Search
USPC .......................................................... 340/438
See application file for complete search history.

(56) References Cited

U.S. PATENT DOCUMENTS

| | | | |
|---|---|---|---|
| 2016/0280129 A1* | 9/2016 | Newbound | .............. B60Q 3/51 |
| 2017/0203687 A1* | 7/2017 | Kuo | ........................ E05B 17/10 |
| 2017/0217364 A1 | 8/2017 | Noboritate et al. | |
| 2018/0291671 A1 | 10/2018 | Schmidt et al. | |
| 2018/0297471 A1* | 10/2018 | Stefan | ................ G02B 27/0101 |
| 2020/0180490 A1 | 6/2020 | Benliyan et al. | |
| 2021/0034207 A1* | 2/2021 | Kuraishi | ................ B60K 35/00 |

FOREIGN PATENT DOCUMENTS

| | | |
|---|---|---|
| DE | 10 2017 201 397 A1 | 8/2017 |
| DE | 10 2017 206 134 A1 | 10/2018 |
| DE | 10 2017 206 312 A1 | 10/2018 |
| DE | 10 2017 210 640 A1 | 12/2018 |
| EP | 3 072 743 A2 | 9/2016 |

OTHER PUBLICATIONS

German-language Written Opinion (PCT/ISA/237) issued in PCT Application No. PCT/EP2020/086046 dated Mar. 30, 2021 (six (6) pages).

German-language Search Report issued in German Application No. 10 2020 100 041.3 dated Dec. 1, 2020 with partial English translation (12 pages).

* cited by examiner

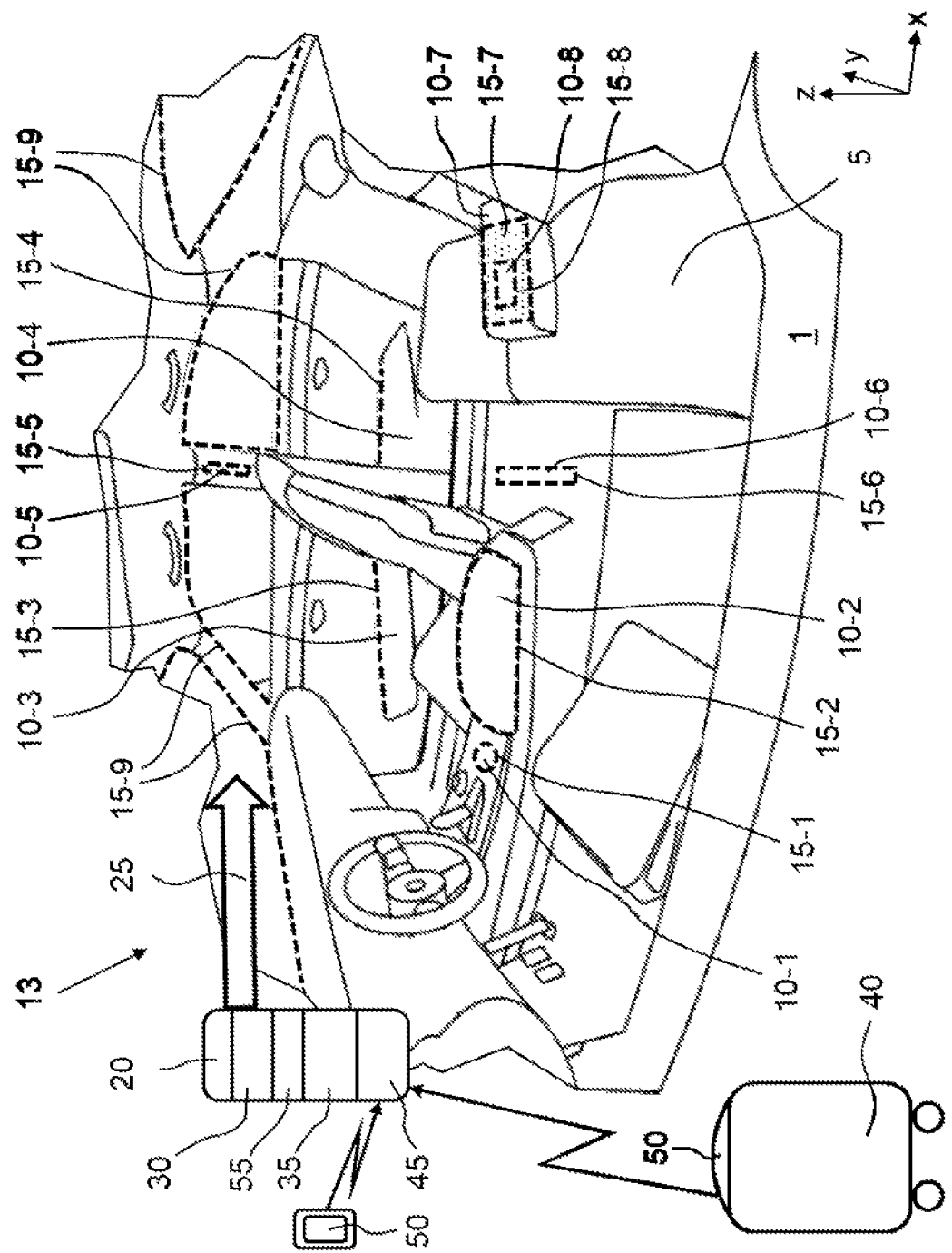

DEVICE AND SYSTEM FOR THE TEMPORARY AND ANTICIPATORY ACCENTUATION OF AT LEAST ONE STORAGE DEVICE LOCATED IN A MOTOR VEHICLE, AND MOTOR VEHICLE EQUIPPED THEREWITH

FIELD

The present invention relates to a device for the temporary and anticipatory accentuation of at least one storage device located in a motor vehicle, a system equipped therewith, and a motor vehicle equipped therewith.

BACKGROUND AND SUMMARY

Accentuators for optically highlighting storage spaces located in an interior of a motor vehicle are generally known. These have lighting which is also switched on at discrete points upon switching on of the vehicle interior light and then are permanently in operation until the vehicle interior light is switched off.

It is the object of the present invention to specify an alternative to the known accentuator.

This object is achieved by the present disclosure. Advantageous refinements are also defined in the present disclosure.

According to the invention, a device is provided for the temporary and anticipatory accentuation of at least one storage device, which is located in a motor vehicle and is operationally connected to at least one accentuator, and which has a controller at least temporarily operationally connected to the accentuator. The controller is in turn configured to alternately put the accentuator into operation, change or not change it during the operation, or take it out of operation based on an accentuation signal output by a computation device, wherein the accentuation signal represents accentuation interest information. If the accentuator is out of operation, it is essentially not visible as such to an observer. In contrast, if the accentuator is in operation, it is thus recognizable by an observer at such a location and/or at such a time at which visibility of the accentuator is desired. The startup takes place here on the basis of the accentuation interest information, which is based on a known or anticipated behavior of a user and/or the usage context. Furthermore, the accentuation interest information can contain data which represent user inputs in a correspondingly designed motor vehicle, a current behavior of a user, a current context of a media playback, and/or a driving mode, current location data of the motor vehicle, an eye movement of a user over time, and possibly the locations which he has looked at, or the urgency of the need for storage. In addition, the accentuation interest information can contain data which have as the subject matter items of information in reference to the number and position of the user and his movement direction, items of information about objects which the user carries with him and their properties (in particular their size, weight, format, surface properties such as friction (risk of slipping), sensitivity, in particular to pressure, sensitivity to soiling, temperature requirement (in particular with respect to objects to be stored refrigerated, which cannot be stored in regions lighted by the sun or close to the heater)), source of the information, in particular from calendars and/or apps, known habits of the user, such as in particular the presence of a work bag on the way to work. Finally, the accentuation interest information can contain data which represent items of information on the person of a user alone and/or possible companions, such as in particular with reference to his or their height, proportions, age, health condition, and/or physical restrictions.

The invention is distinguished in that now a context-sensitive accentuation of a storage device is created. It is thus recognized based on context knowledge whether and where a need for storage exists, and in particular which properties of this storage (in particular size, shape, necessity for security, and/or sensitivity to soiling) are necessary, based on which a suitable storage is selected. Greater visual calm is advantageously created in the vehicle interior in this way for the case in which the accentuator is out of operation. In contrast, when the accentuator is put into operation, it advantageously experiences a greater level of attention by an observer, so that he is capable of recognizing a storage device relevant for him more quickly and easily. This applies in particular for the case when he uses a correspondingly equipped motor vehicle for the first time, in particular in the case of a car rental, a ridesharing service, or a car sharing service.

It is to be noted that the device according to the invention can also be operationally connected to a closure located on the storage device, in particular a lock, and/or a driver. For the case in which an accentuator is put into operation, it can be provided that the closure and/or the driver are also put into operation at the same time or with a slight time delay, in order to not only visually highlight the storage device, but also release it for its use, in particular open it, to thus further increase the level of comfort linked to the device according to the invention.

According to one preferred embodiment of the device, it is provided that the accentuator has at least one light emitter for emitting light, at least one actuator for changing the surface formation of the storage device, and/or at least one sound output device for outputting at least one tone. In this way it is possible to address the visual perception, the auditory perception, or the acoustic perception of the user, so that the device according to the invention can advantageously be used at any time of the day or night.

A particularly simple structure of the device according to the invention is advantageously provided if the light emitter is designed at least partially as an optical fiber, light-emitting diode, liquid crystal display, or projector, the actuator is designed as a gearing device, vibration device, hydraulic adjustment device, or pneumatic adjustment device, and the sound output device is designed as a loudspeaker. It is to be noted that the mentioned light emitter, actuator, and sound output device can each be covered by a concealment device in such a way that they are essentially not recognizable when the accentuator is out of operation, but are recognizable when the accentuator is in operation.

The reliability of the device according to the invention is advantageously further improved if the computation device is operationally connected to a sensor, preferably a camera, and/or an external data source, preferably a mobile communication device, which is in turn configured to detect the approach, movement, and/or distance of at least one body part of a user and/or an object to be transported. In other words, it is possible to put the accentuator into operation, change or not change it during the operation, or take it out of operation if a computation device outputs a corresponding item of information, the input variables of which are detected by a sensor in particular in dependence on a viewing direction, a head position, or a position of another body part of a user. The sensor can be located inside the motor vehicle interior or on the outside of the motor vehicle.

Alternatively or additionally, it can be provided that the device according to the invention is equipped with a speech input device, via which relevant data for its operation, in particular accentuation interest information, can be input in a simple manner to alternately put it into operation, change or not change it during operation, or take it out of operation.

According to a further preferred embodiment, the device according to the invention has a storage device operationally connected to the computation device and/or controller, in which items of accentuation interest information which are current and/or originate from the past are stored. It is advantageously possible in this way to use or make usable in particular personalized items of accentuation interest information over various motor vehicles.

The controller is configured to control the accentuator with respect to its operating time, operating duration, position, intensity, and/or range. A high level of versatility of the device according to the invention is advantageously provided in this way.

The above-mentioned object is also achieved by a system for the temporary and anticipatory accentuation of at least one storage device located in a motor vehicle, which has at least one device of the above-disclosed type and a first telecommunication device which can be operationally connected thereto at least temporarily, and which is configured to output items of accentuation interest information to the device. It is thus possible in particular that a user transmits desired items of accentuation interest information via a second telecommunication device, in particular a smartphone, to the device according to the invention in order to accentuate certain or all in a motor vehicle to be used by him according to his wishes. The accentuation interest information can be input manually by a user or a third party or can be read in or input automatically. It is obvious that a communication between first telecommunication device and second telecommunication device can also be provided bidirectionally.

According to one preferred embodiment, a second telecommunication device is located in an object transportable by a user, in particular a suitcase, wherein the first telecommunication device and the second telecommunication device can establish an operational connection to one another. In other words, it is possible that an object to be transported communicates with the above-disclosed device about items of accentuation interest information, due to which an automated reconciliation can take place between an object to be transported using a motor vehicle and a storage possible for this purpose. The possibility is thus advantageously provided that a specific storage option for the object to be transported is automatically displayed by the accentuator to a user of a correspondingly equipped motor vehicle. It is obvious that if desired further telecommunication device can also be operationally connected to the first telecommunication device. It is thus possible in particular that a telecommunication device provided in a computing center establishes an operational connection to the first and/or the second telecommunication device to transmit current and/or stored items of accentuation interest information to the controller.

Finally, the above-mentioned object is achieved by a motor vehicle having at least one storage device operationally connected to an accentuator, which has at least one device and/or one system of the above-disclosed type. The above-mentioned advantages apply adequately.

The motor vehicle according to the invention is advantageously distinguished in that at least one storage device is located in the motor vehicle interior and is designed as a side pocket, center console, armrest, foot rest, cup holder, mobile telephone tray, coat hook, pocket, drawer, tensioner, refrigerator, luggage rack, or as a band at least partially enclosing at least one window surface. However, it is obvious that other storage spaces, which are not mentioned here and are located in particular in a luggage compartment or in the front region of a motor vehicle, can also be provided with a device according to the invention.

A detailed, non-prejudicing, in particular restricting, description of an exemplary embodiment of the present invention is provided hereinafter with reference to the attached FIGURE, which is not to scale.

BRIEF DESCRIPTION OF THE DRAWING

FIG. 1 is an illustration of a part of an interior of a motor vehicle.

DETAILED DESCRIPTION

In the single FIGURE, FIG. 1, a part of a motor vehicle 1, especially a part of its interior 5, is shown in a side view.

An array of storage devices 10 are located in the interior 5, which are designed in the exemplary embodiment shown here as a cup holder 10-1, center console 10-2, front side pocket 10-3, rear side pocket 10-4, coat hook 10-5, tensioning belt 10-6, rear armrest 10-7, and a mobile telephone tray 10-8 located thereon.

Furthermore, a device 13 for the temporary and anticipatory accentuation of the storage devices 10, 10-1, 10-2, 10-3, 10-4, 10-5, 10-6, 10-7, 10-8, which has an array of accentuators 15, is provided in the motor vehicle 1. These accentuators 15 are not recognizable as such in an out of operation state.

Specifically, around the outer edge of the cup holder 10-1, an accentuator 15-1 enclosing it in the form of a light emitter designed as an optical fiber is arranged.

On the center console 10-2, an accentuator 15-2 is located, which comprises, on the one hand, a light emitter enclosing its outer border or outer edge and designed as an optical fiber, on the other hand, an actuator (not shown in greater detail here), which can geometrically change the surface of the outer border or the outer edge.

In the upper section of the front side pocket 10-3, an accentuator 15-3 designed as an optical fiber is located. In the upper section of the rear side pocket 10-4, an accentuator 15-4 also designed as an optical fiber is located.

The coat hook 10-5 fastened on the B column of the motor vehicle 1 has an accentuator 15-5 designed as an optical fiber on its circumference.

The tensioning belt 10-6 located in the rear region of the motor vehicle 1 is designed as a planar light emitter.

The armrest 10-7 located on the rear seat bench has two accentuator 15, namely an accentuator 15-7, which is flatly formed, is designed having an actuator (not shown here), and is formed from a textile material, and which is provided to accommodate an arm (not shown here), and an accentuator 15-8, which is located essentially in the middle of the accentuator 15-7 and is designed as an optical fiber, and which extends along the outer edge of the mobile telephone tray 10-8.

Finally, an accentuator 15-9 designed as an optical fiber is provided in each case on the edges of the windows (windshield, front side window, rear side window, rear window) located on the motor vehicle 1 (not shown in greater detail for reasons of clarity).

Each individual one of the accentuator 15, 15-1, 15-2, 15-3, 15-4, 15-5, 15-6, 15-7, 15-8, and 15-9 is operationally connected to a symbolically shown controller 20, as is symbolized by the arrow 25 representing an operational connection. The operational connection 25 can take place in any suitable way, for example, wired or wireless, in particular by a Bluetooth connection. The controller 20 is configured to control one, multiple, or all accentuator 15, 15-1, 15-2, 15-3, 15-4, 15-5, 15-6, 15-7, 15-8, and 15-9, i.e., to change the time or location of or to keep constant their switching on or switching off moment, operating time, operating duration, position, surface formation, intensity, or range.

For this purpose, the controller 20 is operationally connected to a computation device 30, for example a microchip, which is in turn operationally connected to a sensor 35. The sensor 35 is configured to detect the approach, movement, and/or distance of a body part (not shown here) of a vehicle occupant, for example, his hand or his face, or of an object 40 to be transported located outside the motor vehicle 1 and to output a signal which represents an item of accentuation interest information to the computation device 30.

Finally, an optional first telecommunication device 45 is provided, which is operationally connected to the computation device 30. Items of information transmitted from a second telecommunication device 50 can be received by the first telecommunication device 45, which are used to control the accentuator 15. The second telecommunication device 50 can, according to the exemplary embodiment shown here, be designed as a smartphone operable by a user (not shown here), as a telecommunication device located in the object 40 to be transported or on any other suitable object, or in any other suitable way. It is thus also conceivable to provide the second telecommunication device 50 in a different institution, for example, a computing center of a car rental company.

However, it is to be noted that the first telecommunication device 45 can also be operationally connected directly to the controller 20 when the signals transmitted from the second telecommunication device 50 have such a character that they are converted directly by the controller 20 into control signals.

Finally, the device 10 of the exemplary embodiment shown here has a storage device 55, which is operationally connected to the controller 20. Data for controlling the accentuator 15 are stored in the storage device 55, which contain, for example, items of historic information about an actually desired control of the accentuator 15 by a user.

An exemplary, nonrestrictive usage scenario is described hereinafter:

After a flight, a user (not shown here) reaches an airport, at which he wishes to retrieve a rental car (e.g., reference sign 1 in the FIGURE). The rental car 1 has the accentuator 15 or 15-1 to 15-9 shown in the FIGURE. These are out of operation when the rental car 1 is turned off and thus do not stand out to an observer of the rental car 1 and its interior 5.

The user carries a mobile telephone and a suitcase (e.g., reference sign 40) with him, each of which has a second communication device 50. After release by the renter of the rental car, these communication devices establish communication with the first communication device 45, which is part of a device 13 for the temporary and anticipatory accentuation of the above-described accentuator 15. On the way to the rental car 1, the user buys a beverage in a cup. An item of information representing the size and shape of the cup is also sent by the seller of the beverage to the first communication device 45. This information, and the information that a single authorized person having a single piece of luggage 40 of specific dimensions and weight (this was ascertained beforehand by the airline and transmitted to the second communication device 50 of the mobile telephone of the user) and having a mobile telephone is moving toward the rental car 1, is stored in the storage device 55 of the device 13.

On the basis of location data, and assisted by a motion sensor (which is in turn part of a sensor 35 of the device 13) located on the rental car 1, when the distance of the user from the rental car 1 falls below a minimum distance, firstly its driver's door is opened, the accentuator 15-1 of a cup holder 10-1 provided in the vehicle interior 5 and an accentuator of a mobile telephone tray (not shown in the FIGURE) located adjacent to the cup holder 10-1 are illuminated and the luggage compartment lid (not shown in the FIGURE) is opened. The user deposits his beverage cup in the cup holder 10-1 and the corresponding accentuator 15-1 goes out. In contrast, the user keeps his mobile telephone with him and does not deposit it in the mobile telephone tray; the accentuator of the mobile telephone tray remains illuminated in this case.

The user now moves his piece of luggage 40 toward the vehicle rear and deposits it in the luggage compartment at a point which is indicated by an illuminated accentuator located therein. This point is selected on the basis of the size and the weight of the piece of luggage 40 in such a way that the user experiences maximum comfort when housing it in the luggage compartment. To secure the piece of luggage 40 now located in the luggage compartment, a tensioning belt provided with an accentuator is illuminated, which is fastened by the user on a corresponding receptacle. The receptacle itself also has an accentuator, which is only illuminated, however, when the user has taken the tensioning belt in the hand. If this tensioning belt is securely held in the corresponding receptacle, the accentuator of the tensioning belt and the accentuator of the receptacle are put out of operation. In contrast, if the tensioning belt is not held securely in the receptacle, the two mentioned accentuators change their color from a signal color to a color representing a warning and a warning tone sounds.

After the piece of luggage 40 is stowed securely in the luggage compartment, the user moves in the direction of the vehicle front and takes a seat on the driver's seat. If the user deposits his mobile telephone on the illuminated mobile telephone tray, the accentuator located here also goes out.

LIST OF REFERENCE SIGNS

1 passenger vehicle
5 interior
10 storage device
10-1 cup holder
10-2 center console
10-3 front side pocket
10-4 rear side pocket
10-5 coat hook
10-6 tensioning belt
10-7 rear armrest
10-8 mobile telephone tray
10-9 accentuator at the edges of window surfaces
13 device for temporary and anticipatory accentuation
15 accentuator
15-1 accentuator of the cup holder
15-2 accentuator of the center console
15-3 accentuator of the front side pocket
15-4 accentuator of the rear side pocket 15-5 accentuator of the coat hook
15-6 accentuator of the tensioning belt
15-7 accentuator of the rear armrest
15-8 accentuator of the mobile telephone tray
15-9 accentuator at the edges of window surfaces
20 controller
25 operational connection
30 computation device
35 sensor
40 object
45 first telecommunication device
50 second telecommunication device
55 storage device
x, y, z coordinates of a vehicle-intrinsic coordinate system according to ISO 4130-1978.

What is claimed is:

1. A device for temporary accentuation of at least one storage device located in a motor vehicle, the device comprising:
a controller configured to:
at least temporarily operationally connect to an accentuator that is operationally connected to the storage device;
cause a change in an operation of the accentuator comprising at least one of:
causing the accentuator to be put into operation;
changing the accentuator during operation of the accentuator; or
causing the accentuator to be put out of operation,
wherein the controller is configured to cause the change in the operation of the accentuator on a basis of an accentuation signal output by a computation device,
wherein the accentuation signal represents an item of accentuation interest information originating from the past representing historical information about desired control of the accentuator by a user, wherein the item of accentuation interest information is stored in a data store operationally connected to the computation device and/or the controller,
wherein the accentuator is not recognizable as such by an observer in its state out of operation, and
wherein the computation device is operationally connected to a sensor, which is in turn configured to detect an approach, movement, and/or distance of an object to be transported in the storage device.

2. The device according to claim 1, wherein the accentuator has at least one of a light emitter configured to emit light and/or a sound output device configured to output at least one tone.

3. The device according to claim 2, wherein the light emitter comprises at least one of an optical fiber, a light-emitting diode, a liquid crystal display, or a projector.

4. The device according to claim 2, wherein the sound output device comprises a loudspeaker.

5. The device according to claim 1, wherein the sensor is configured to detect an approach, movement, and/or distance of at least one body part of the user.

6. The device according to claim 1, further comprising: data store operationally connected to the computation device and/or the controller, in which items of accentuation interest information which are current are stored.

7. The device according to claim 1, wherein the controller is configured to control the accentuator with respect to its operating time, operating duration, position, color, pattern, intensity, and/or range.

8. A system for temporary accentuation of the at least one storage device located in the motor vehicle, the system comprising:
the device according to claim 1; and
a first telecommunication device configured to at least temporarily operationally connect to the device and to output the items of accentuation interest information to the device.

9. The system according to claim 8, further comprising:
a second telecommunication device located in the object to be transported, wherein the second telecommunication device is configured to operationally connect to the first telecommunication device.

10. A motor vehicle comprising:
the device according to claim 1; and
the at least one storage device operationally connected to the accentuator.

11. The motor vehicle according to claim 10, wherein the at least one storage device is located in the motor vehicle interior and comprises at least one of a side pocket, a center console, an armrest, a foot rest, a cup holder, a mobile telephone tray, a coat hook, a pocket, a drawer, a tensioning device, or a band at least partially enclosing at least one window surface.

12. The device according to claim 1, wherein the accentuator has an actuator configured to change a surface formation of the storage device.

13. The device according to claim 12, wherein the actuator comprises at least one of a gearing device, a hydraulic adjustor, or a pneumatic adjustor.

14. A method for temporarily accentuating at least one storage device located in a motor vehicle, the method comprising:
receiving, by a controller, an accentuation signal output by a computation device, wherein the accentuation signal represents an item of accentuation interest information originating from the past representing historical information about desired control of the accentuator by a user, wherein the item of accentuation interest information is stored in a data store operationally connected to the computation device and/or the controller;
detecting, by a sensor operationally connected to the computation device, an approach, movement, and/or distance of an object to be transported;
connecting, by the controller, at least temporarily operationally, to an accentuator that is operationally connected to the storage device; and
causing, by the controller, a change in an operation of the accentuator on a basis of the accentuation signal output by the computation device comprising to provide an indication of the at least one storage device as a location in which to store the object to be transported, wherein the change in the operation of the accentuator comprises at least one of:
causing the accentuator to be put into operation;
changing the accentuator during operation of the accentuator; or
causing the accentuator to be put out of operation,
wherein the accentuator is not recognizable as such by an observer in its state out of operation.

15. The method of claim 14, wherein the accentuator has at least one of a light emitter configured to emit light and/or a sound output device configured to output at least one tone.

16. The method of claim 14, further comprising:
detecting, by the sensor, an approach, movement, and/or distance of at least one body part of a user.

17. The method of claim 14, further comprising:
storing items of accentuation interest information which are current in the data store, the computation device and/or the controller.

18. The method of claim 14, further comprising:
controlling, by the controller, the accentuator with respect to its operating time, operating duration, position, color, pattern, intensity, and/or range.

19. The method of claim 14, further comprising:
changing a surface formation of the at least one storage device using an actuator.

20. The method of claim 19, further comprising:
changing the surface formation of the at least one storage device using at least one of a gearing device, a hydraulic adjustor, or a pneumatic adjustor.

* * * * *